(12) United States Patent
Duncan

(10) Patent No.: US 6,282,730 B1
(45) Date of Patent: Sep. 4, 2001

(54) MAGNETIC STOPPER

(75) Inventor: Scott Duncan, Santa Rosa, CA (US)

(73) Assignee: E-Ticket Enterprises, LLC, Santa Rosa, CA (US)

( * ) Notice: Subject to any disclaimer, the term of this patent is extended or adjusted under 35 U.S.C. 154(b) by 0 days.

(21) Appl. No.: 09/291,229

(22) Filed: Apr. 13, 1999

Related U.S. Application Data

(60) Provisional application No. 60/081,865, filed on Apr. 15, 1998.

(51) Int. Cl.$^7$ .............................. E03C 1/23; F16K 31/08
(52) U.S. Cl. ..................... 4/287; 4/688; 4/295; 251/65
(58) Field of Search ................... 4/287, 286, 668, 4/688, 295; 251/65; 403/DIG. 1; 464/29

(56) References Cited

U.S. PATENT DOCUMENTS

| | | | |
|---|---|---|---|
| 4,384,703 | * 5/1983 | Ruyak et al. ........................... 251/65 |
| 4,457,030 | * 7/1984 | Burry ........................................ 4/688 |
| 5,208,921 | * 5/1993 | Nicoll ....................................... 4/286 |
| 5,230,365 | * 7/1993 | Woltz et al. .......................... 137/607 |
| 5,363,519 | * 11/1994 | Husting ..................................... 4/689 |
| 5,611,368 | * 3/1997 | Hwang et al. ........................ 137/553 |
| 5,640,724 | * 6/1997 | Holmes .................................... 4/689 |

* cited by examiner

Primary Examiner—Henry J. Recla
Assistant Examiner—Peter DeVore
(74) Attorney, Agent, or Firm—Malcom B. Wittenberg

(57) ABSTRACT

A waste outlet fitting for use in tubs, sinks and basins. A magnetic plug is mounted in the waste outlet which can be rotated between open and closed positions through the use of a rotatable magnetic located proximate to the plug. The magnetic is rotatable by use of a remotely located handle employing cable, wire or rods for connecting the handle and magnetic.

12 Claims, 4 Drawing Sheets

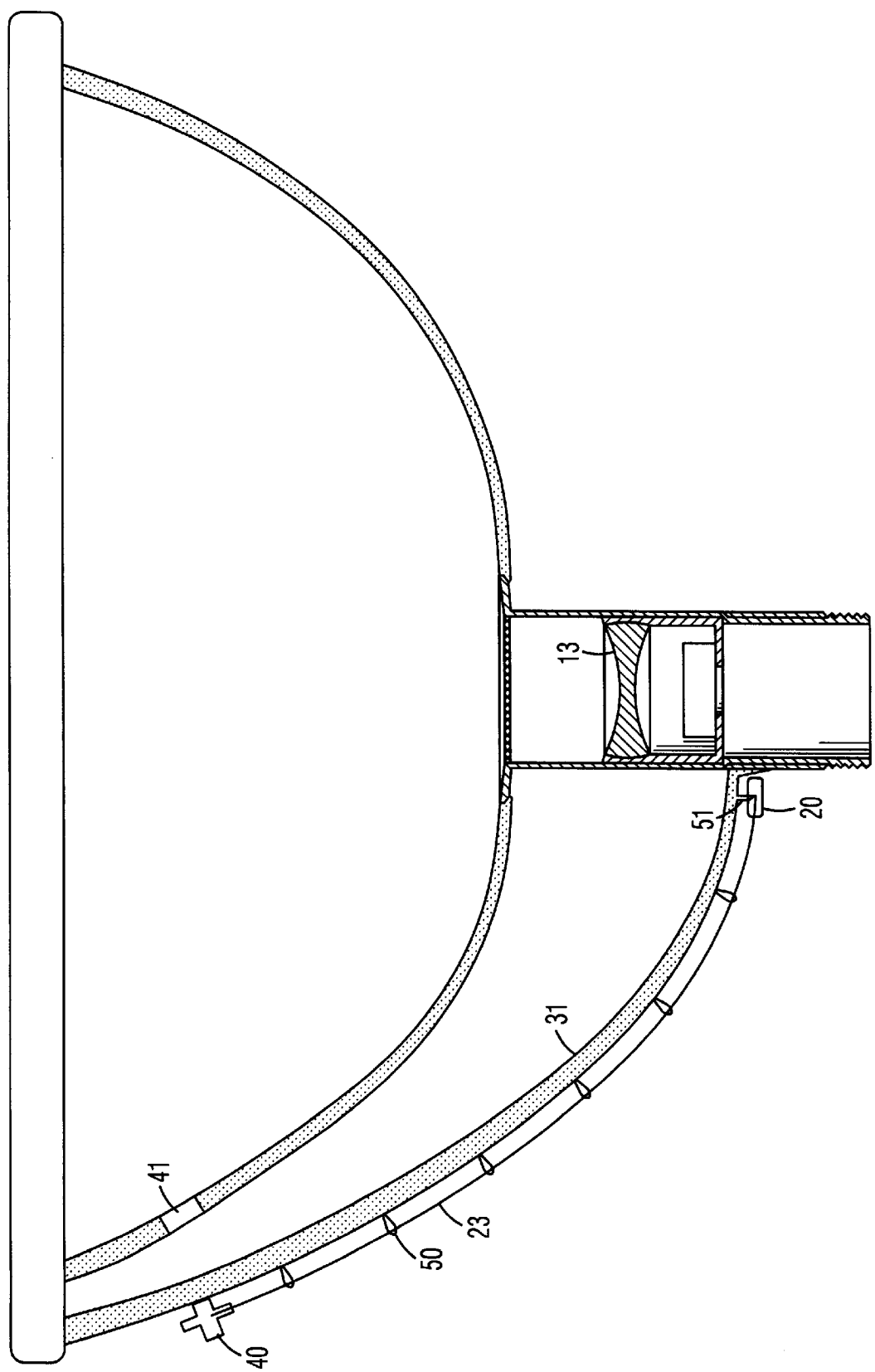

MAGNETIC STOPPER

This application claims the benefit of U.S. Provisional No. 60/081,865 filed Apr. 15, 1998.

TECHNICAL FIELD OF INVENTION

The present invention deals with a stopper for a waste outlet fitting which can be employed with a bath, basin, sink and similar water containment devices which require stoppage and eventual drainage. The present invention enables a user to selectively drain such a water containment device remotely while eliminating the need for complex linkages or conventional stoppers.

BACKGROUND OF THE INVENTION

Sinks, basin, baths and similar water containment devices are invariably equipped with means for temporarily preventing water loss. Historically, rubber stoppers have been employed sized to snugly fit within a waste pipe in order to close the waste outlet when it is desired to fill the water containment receptacle. Separate stoppers, however, tend to lose their water retaining confirmation with the waste outlet opening and also can be lost or temporarily misplaced particularly in hotels and other publically available facilities.

Tubs and sinks have also been traditionally fit with a multi-part linkage so that the water retention stopper can be drawn within a conforming waste outlet fitting by pulling a rod usually located between the hot and cold water handles of the installation. However, such linkages tend to loosen in time so that it is not only difficult to achieve a watertight seal between the plug and outlet fitting but when the outlet becomes clogged, it is quite difficult without professional intervention to achieve access to the waste flow passage upon which the fitting resides.

U.S. Pat. No. 4,457,030 which issued on Jul. 3, 1984, describes an improved waste outlet fitting shown in FIG. 1. Specifically, waste outlet fitting 1 comprising tubular body 2 and plug 3 is illustrated where tubular body 2 comprises a tubular member 4 having an outwardly extending flange 5 at the upper end thereof and external screw thread 6 at the lower end thereof. Tubular member 4 is sealingly mounted in a waste outlet opening of a suitable water containment device such as a bath, basin or sink and a waste pipe is connected to its lower end. The tubular body 2 also includes an insert member 7 located within a counter-bore at the upper end of the tubular member 4. The insert member defines a part-spherical seat 8 in which the plug 3 is captive.

The patentee goes on to describe plug 3 as being generally disk-like shaped including a part-spherical periphery 9 complementary to seat 8. In use, when plug 3 is in the closed position as shown in FIG. 1, the periphery 9 sealingly engages the seat 8 and the body of the plug extends across the flow passageway 10 defined within the tubular body 2 in order to close the flow passage to fluid flow. When one wishes to open the flow passage 10, it is taught that finger pressure can be applied to any point of the upper surface of plug 3 adjacent its periphery and the plug is thereby swiveled to a generally up-right configuration about a horizontal axis passing through the centroid of the sphere defined by the seat and plug to an orientation shown in phantom by element 3'.

Although the waste outlet fitting of the '030 patent operates as suggested, the invention, by its very nature, exhibits a shortcoming to which the present invention now addresses. Specifically, if one wishes to drain a bath, sink or the like using the invention depicted in the '030 patent, one must immerse one's hand within the retained body of water, feel for the periphery of plug 3 and apply appropriate finger pressure to break the seal created by plug 3 enabling the water to drain. There are instances where one might hesitate or at least find it distasteful to place one's hand within a retained body of water due to its fouled or contaminated nature and, if sufficiently turbid, one might have a difficult time feeling for the appropriate peripheral location of plug 3 to apply finger pressure.

It is thus an object of the present invention to provide a waste outlet fitting similar to that shown in the '030 patent but yet which is capable of being opened and closed remotely without the need for employing complex multi-arm linkages traditionally found in prior art devices.

These and further objects will be more readily apparent when considering the following disclosure and appended claims.

BRIEF DESCRIPTION OF THE DRAWINGS

FIG. 4 is yet another cross-sectional view of a further embodiment of the present invention employed as an add-on to existing baths, sinks and the like.

SUMMARY OF THE INVENTION

The present invention is an improvement over a waste outlet fitting which comprises a tubular body which, in use, is sealingly mounted in a waste outlet opening. A longitudinally extending waste flow passage is defined within the tubular body which in turn houses a seat surrounding the flow passage. A circular disk-like plug is mounted on the body capable of being rotated along a longitudinal axis between a closed position in which the periphery of the plug sealingly engages the seat extending the plug across the flow passage and an open position in which portions of the periphery of the plug are spaced from the seat to permit fluid flow through the flow passage. The plug periphery and the seat are of a mating relationship, whereby the plug is held in the tubular body by interaction of the part-spherical periphery of the plug with the mating part-spherical seat. The improvement comprises fabricating the circular disk-like plug from a first magnet and providing a second magnet placed proximate the circular disk-like plug, the second magnet being capable of being rotated 90° about an axis whereupon the circular disk-like plug can be rotated around its horizontal axis by merely rotating the second magnet about its axis.

DETAILED DESCRIPTION OF THE INVENTION

Figure 1:
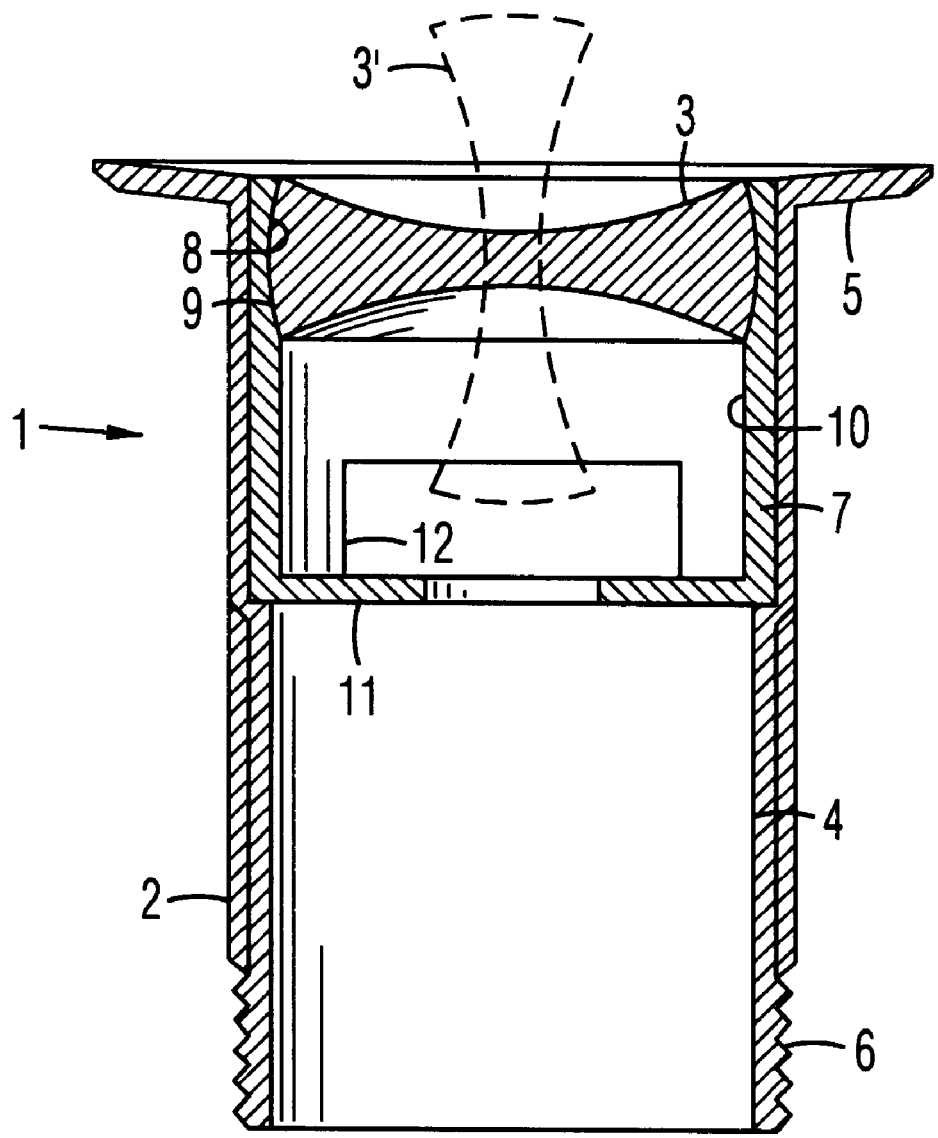
FIG. 1 is a cross-sectional view of the prior art represented by U.S. Pat. No. 4,457,030.
Figure 2:
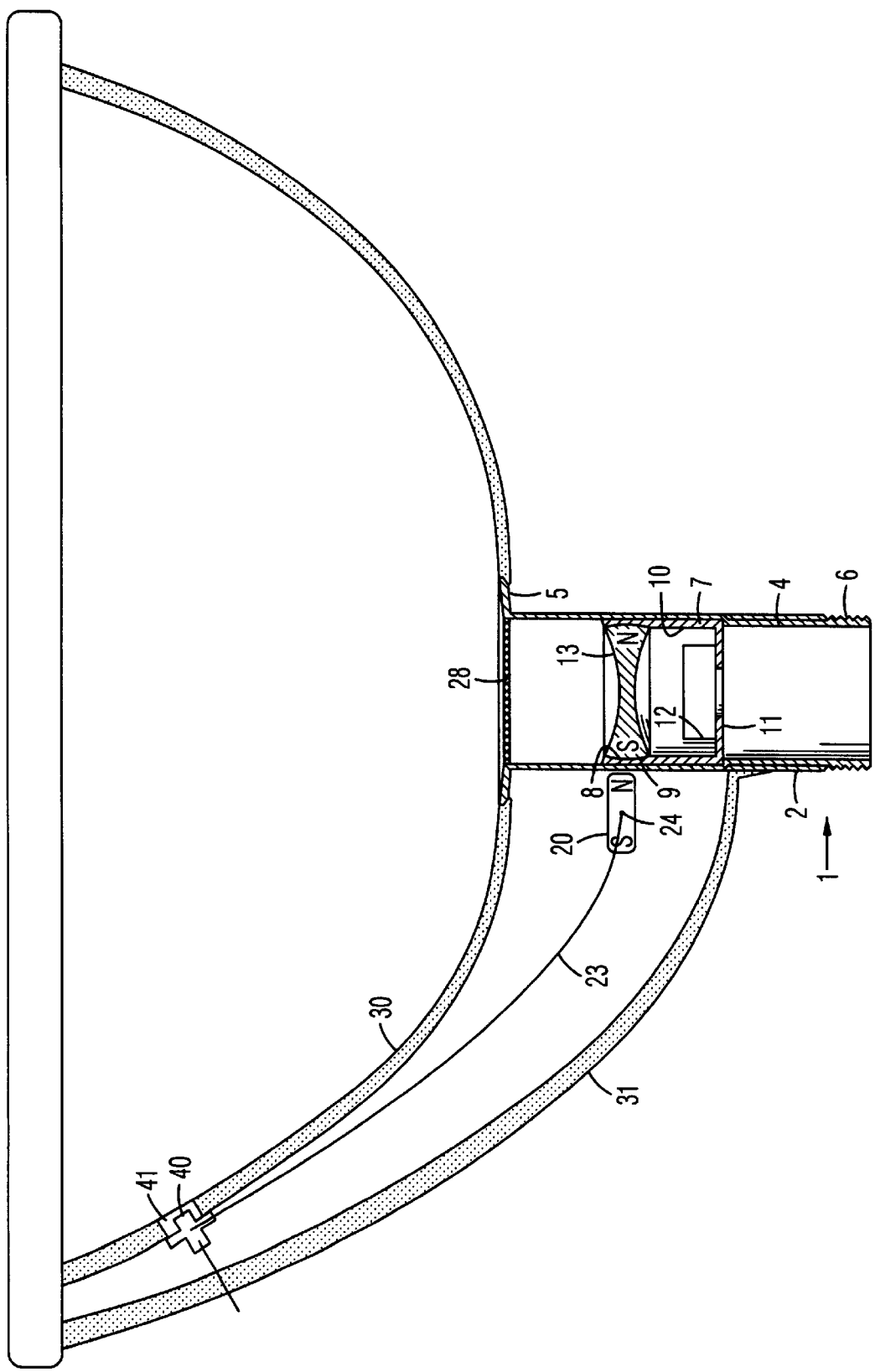
FIG. 2 is a cross-sectional view of the present invention where the closure plug being horizontally oriented closes the waste outlet fitting.

Reference is made to FIG. 2 which employs like numerals to those displayed on FIG. 1 for all common elements. As in FIG. 1, plug 13 is shown to be disk-like in shape and includes a part-spherical periphery 9 complimentary to the seat 8. FIG. 2 shows plug 13 in the closed position whereby periphery 9 sealingly engages seat 8 and the body of plug 13 extends across the flow passage 10 defined within the tubular body 2 in order to close the flow passageway to fluid flow.

In further reference to FIG. 2, it is noted that plug 13 is comprised of a first magnet whereby its North and South Poles are designated by "N" and "S". The invention further employs a complimentary second magnet 20 connected to a control cable, hard wire or rod 23 all within the double walls 30 and 31 of a suitable sink, basin or like water receptacle. Magnet 20 is capable of rotating about axis 24 through movement of cable, hard wire or rod 23. As noted in FIG. 2, the North "N" Pole of magnet 20 is aligned with the South "S" Pole of the magnet of plug 13 maintaining plug 13 in its horizontal orientation as depicted in FIG. 2. As such, plug 13, in its horizontal orientation, maintains periphery 9 sealingly engaging seat 8 across flow passageway 10.

Figure 3:
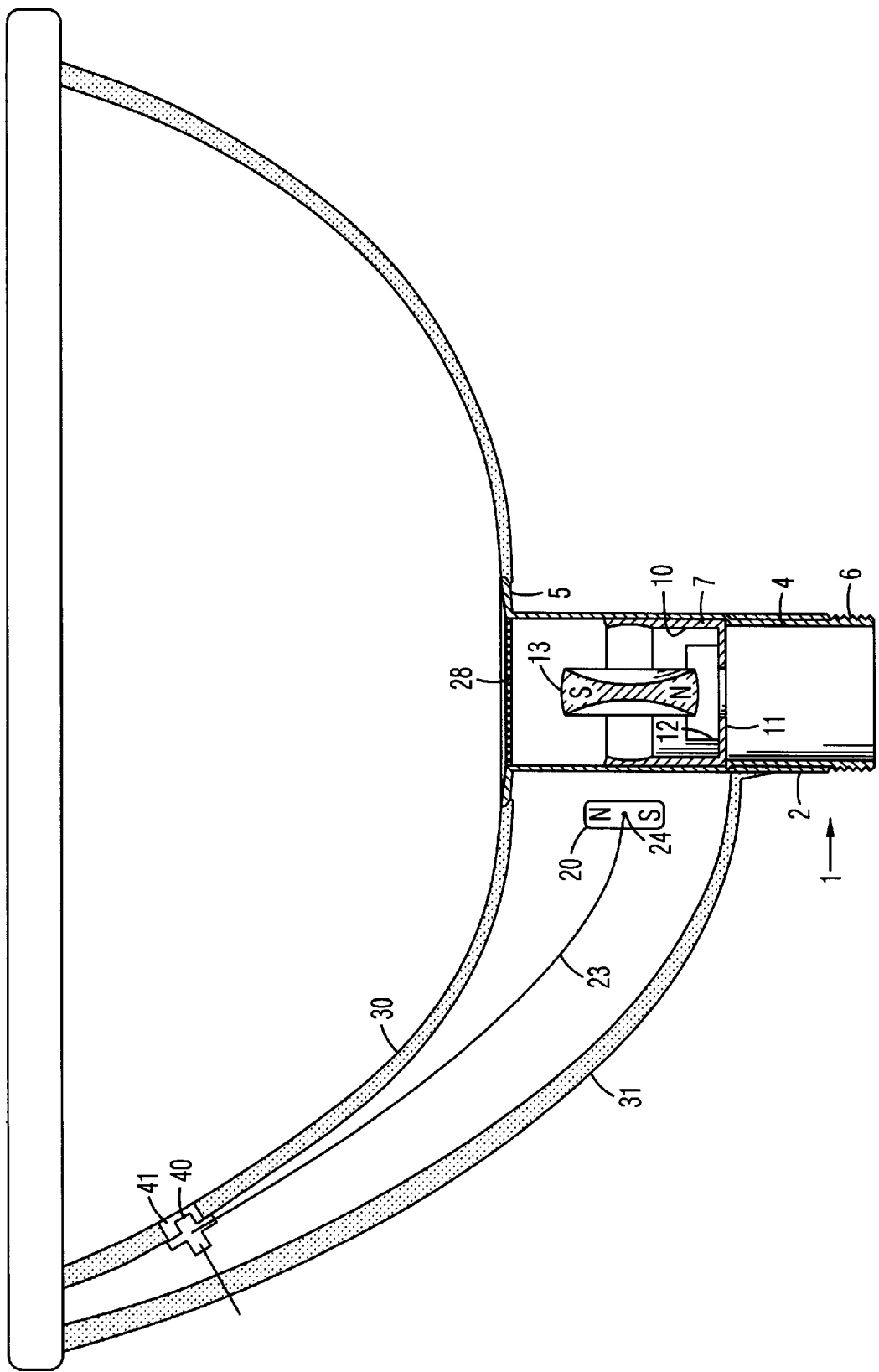
FIG. 3 is a cross-sectional view of the present invention whereby the plug is in a vertical orientation thus allowing the passage of retained water through the disclosed waste outlet fitting.

FIG. 3 shows the orientation of plug 13 as it is moved from a horizontal to vertical orientation upon the rotation of magnet 20 90°. Upon actuation by cable 23, magnet 20 is caused to rotate about axis 24 so that the North "N" Pole of magnet 20 aligns with the South "S" Pole of plug 13. This causes the two magnets to repel one another in turn causing plug 13 to maintain the vertical orientation as shown in FIG. 3.

Although not shown, when one wishes to close plug 13 enabling its periphery 9 to sealingly engage seat 8, magnet 20 is slightly rotated so that the opposite poles of plug 13 and magnet 20 enter into an attracting relationship until full 180° rotation is made of rectangularly shaped magnet 20. Magnetic attraction thus causes plug 13 to assume the horizontal orientation shown in FIG. 2.

It is further noted that, as a preferred embodiment, plug 13 and complimentary seat 8 are placed below screen 28 to prevent finger contact with plug 13. The present invention recognizes that the opening and closing of passageway 10 through the rotation of plug 13 does not rely upon finger pressure but simply upon actuation of cable, hard wire or rod 23 and consequent rotation of magnet 20. As such, there is no need for fingers to touch plug 13 and the entire assembly can be placed out of reach of the user.

In addition, it is further recognized that cable, hard wire or rod 23 can be placed, as shown, between inner and outer sidewalls of a suitable basin, sink or tub in an original installation. As such, the means to actuate the opening and closing of plug 13 need not be visible to the user providing for a professional installation. Handle 40 used to actuate cable, hard wire or rod 23 can emanate from the spill opening 41 of the sink or tub for access to the user.

FIG. 4 depicts a further embodiment wherein a pre-existing sink or tub can be fit with the present invention. Specifically, cable, hard wire or rod 23 can be attached to the outer sink or tub surface 31 by use of attachment means 50. These attachment means can be secured to surface 31 by any conventional expedient such as by adhesive. Similarly, magnet 20 can be rotatably secured to surface 31 in the vicinity of rotatable magnetic plug 13 located within the appropriate retrofitted waste water fitting.

I claim:

1. In a waste outlet fitting for use in a tub, sink or basin comprising a tubular body which in use is sealingly mounted in a waste outlet opening, a waste flow passage defined within the tubular body, a seat defined within the tubular body surrounding the flow passage and a circular disc-like plug mounted in the body moveable between a closed position in which the periphery of the plug sealingly engages the seat whereupon the plug extends across the flow passage to close the flow passage to fluid flow and an open position in which portions of the periphery of the plug are spaced from the seat to permit fluid flow through the flow passage wherein the plug periphery and seat are of mating part-spherical shape, the improvement comprising configuring said plug of a first magnetic material and providing a second magnetic material proximate said plug, said second magnetic material being rotatable about an axis such that said plug can be rotated about an axis of said plug by rotating said second magnetic material.

2. The waste outlet fitting of claim 1 wherein said second magnetic material can be rotated about an axis by rotating a handle located remotely from said waste outlet opening.

3. The waste outlet fitting of claim 2 wherein said handle and said second magnetic material are functionally connected by use of a cable.

4. The waste outlet fitting of claim 2 wherein said handle and said second magnetic material are functionally connected by use of a hard wire or rod.

5. The waste outlet fitting of claim 1 wherein said plug is maintained in a sealing relationship to said seat when a pole of said plug of magnetic material is proximate to a pole of opposite polarity of said second magnetic material.

6. The waste outlet fitting of claim 1 wherein said plug is maintained in a non-sealing relationship to said seat, when a pole of said plug of magnetic material is proximate to a pole of like polarity of said second magnetic material.

7. In a tub having inner and outer side walls, a spill opening and waste outlet, said waste outlet comprising a waste outlet fitting comprising a tubular body which in use is seemingly mounted in a waste outlet opening, a waste flow passage defined within the tubular body, a seat defined within the tubular body surrounding the flow passage and a circular disc-like plug mounted in the body movable between a closed position in which the periphery of the plug sealingly engages the seat whereupon the plug extends across the flow passage to close the flow passage to fluid flow and an open position in which portions of the periphery of the plug are spaced from the seat to permit fluid flow through the flow passage wherein the plug periphery and seat are of mating part-spherical shape, the improvement comprising configuring said plug of a first magnetic material and providing a second magnetic material proximate said plug, said second magnetic material being rotatable about an axis such that said plug can be rotated about an axis of said plug by rotating said second magnetic material.

8. The tub of claim 7 wherein said second magnetic material can be rotated about an axis by rotating a handle located remotely from said waste outlet opening.

9. The tub of claim 8 wherein said handle is located at said spill opening.

10. The tub of claim 8 wherein said handle and said second magnetic material are functionally connected by use of a cable running between said inner and outer side walls.

11. The tub of claim 8 wherein said handle and said second magnetic material are functionally connected by use of a wire or rod running between said inner and outer side walls.

12. The tub of claim 7 wherein a screen is positioned over said waste outlet and above said disc-like plug allowing for the passage of fluid through said waste outlet but preventing finger access to said plug.

* * * * *